US012335112B2

(12) United States Patent
 Iovanna et al.

(10) Patent No.: US 12,335,112 B2
(45) Date of Patent: Jun. 17, 2025

(54) METHOD AND APPARATUS FOR ABSTRACTING NETWORK RESOURCES IN A MOBILE COMMUNICATIONS NETWORK

(71) Applicant: Telefonaktiebolaget LM Ericsson (publ), Stockholm (SE)

(72) Inventors: Paola Iovanna, Pisa (IT); Teresa Pepe, Pisa (IT); Filippo Ponzini, Pisa (IT); Fabio Ubaldi, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 263 days.

(21) Appl. No.: 17/642,818

(22) PCT Filed: Sep. 20, 2019

(86) PCT No.: PCT/EP2019/075380
§ 371 (c)(1),
(2) Date: Mar. 14, 2022

(87) PCT Pub. No.: WO2021/052603
PCT Pub. Date: Mar. 25, 2021

(65) Prior Publication Data
US 2022/0376995 A1 Nov. 24, 2022

(51) Int. Cl.
*H04L 41/5019* (2022.01)
*H04L 41/14* (2022.01)
*H04L 41/5054* (2022.01)

(52) U.S. Cl.
CPC ........ *H04L 41/5019* (2013.01); *H04L 41/145* (2013.01); *H04L 41/5054* (2013.01)

(58) Field of Classification Search
CPC ............... H04L 41/5019; H04L 41/145; H04L 41/5054; H04L 41/5067; H04L 41/142;
(Continued)

(56) References Cited

U.S. PATENT DOCUMENTS 10,645,528 B2 * 5/2020 Vrzic ...................... H04W 4/90
2016/0157147 A1 * 6/2016 Saghir ................ H04W 64/003
455/444
(Continued)

OTHER PUBLICATIONS

Iovanna et al., "5G Mobile Transport and Computing Platform for Verticals", 2018 IEEE Wireless Communications and Networking Conference Workshops (WCNCW), Apr. 15, 2018, p. 266-271 (Year: 2018).*

(Continued)

*Primary Examiner* — Shean Tokuta
*Assistant Examiner* — Juan C Turriate Gastulo
(74) *Attorney, Agent, or Firm* — Weisberg I.P. Law, P.A.

(57) ABSTRACT

A method of abstracting network resources in a mobile communications network includes: determining a service coverage area for a class of service, the class of service defined by service parameters; determining a set of tracking areas that fall at least partly within the service coverage area; selecting available network resources for tracking areas of the set of tracking areas, for providing the class of service in the tracking areas; defining an abstraction view of the selected network resources for the class of service in the service coverage area, the abstraction view having deliverable values of the service parameters within the set of tracking areas; and outputting a communication signal having an indication of the abstraction view.

12 Claims, 8 Drawing Sheets

(58) Field of Classification Search
CPC . H04L 41/40; H04L 41/5022; H04L 41/5025; H04L 41/5032; H04L 41/5016; H04W 16/18

See application file for complete search history.

(56) References Cited

U.S. PATENT DOCUMENTS

| | | | | |
|---|---|---|---|---|
| 2020/0195567 | A1* | 6/2020 | Selvidge | H04L 43/0882 |
| 2020/0274794 | A1* | 8/2020 | Zhang | H04L 43/0882 |
| 2021/0076220 | A1* | 3/2021 | Hirano | H04W 16/02 |
| 2021/0345283 | A1* | 11/2021 | Shimojou | H04W 24/02 |
| 2022/0294709 | A1* | 9/2022 | Mannweiler | H04L 41/5051 |
| 2022/0377653 | A1* | 11/2022 | Zhu | H04W 76/11 |

OTHER PUBLICATIONS

International Search Report and Written Opinion dated Mar. 20, 2020 for International Application No. PCT/EP2019/075380 filed Sep. 20, 2019, consisting of 15 pages.

Iovanna, Paola et al., Title: 5G Mobile Transport and Computing Platform for Verticals; 2018 IEEE Wireless Communications and Networking Conference Workshops (WCNCW): The First Workshop on Control and management of Vertical slicing including the Edge and Fog Systems (COMPASS); 2018; pp. 266-271; consisting of 6 pages.

Li, Xi et al.; Title: Service Ochestration and Federation for Verticals; 2018 IEEE Wireless Communications and Networking Conference Workshops (WCNCW): The First Workshop on Control and management of Vertical slicing including the Edge and Fog Systems (COMPASS); 2018; pp. 260-265; consisting of 6 pages.

Bernardos, C.J. et al.; Title: Multi-domain Network Virtualization; Sep. 2019; consisting of 36 pages.

Chen, Yami et al.; Title: Machine Learning based Radio Resource Management for Network Slicing; ML5G-I-054; Telecommunication Standardization Sector, Focus Group on Machine Learning for Future Networks Including 5G; Date and Location: Aug. 8-10, 2018, Santa Jose, USA; consisting of 15 pages.

EPO Communication dated Sep. 1, 2023 for Patent Application No. 19778454.9, consisting of 6 pages.

3GPP TSG-SA5 Meeting #126 S5-195781 Revision of S5-195429; Title: TD General GST to 3GPP NRM mapping; Agenda Item: 6.4.8; Source: Nokia, Nokia Shanghai Bell; Document for: Discussion and Endorsement; Date and Location: Aug. 19-23, 2019, Bruges, Belgium, consisting of 17 pages.

* cited by examiner

METHOD AND APPARATUS FOR ABSTRACTING NETWORK RESOURCES IN A MOBILE COMMUNICATIONS NETWORK

CROSS-REFERENCE TO RELATED APPLICATIONS

This application is a Submission Under 35 U.S.C. § 371 for U.S. National Stage Patent Application of International Application Number: PCT/EP2019/075380, filed Sep. 20, 2019 entitled "METHOD AND APPARATUS FOR ABSTRACTING NETWORK RESOURCES IN A MOBILE COMMUNICATIONS NETWORK," the entirety of which is incorporated herein by reference.

TECHNICAL FIELD

The invention relates to a method of abstracting network resources in a mobile communications network and to an apparatus for abstracting network resources in a mobile communications network.

BACKGROUND

The fifth generation (5G) network poses new challenging requirements for the definition and deployment of software platforms and environments, such as the European Telecommunication Standards Institute, ETSI, Management and Orchestration, MANO, standard ETSI GR NFV-IFA 022 V3.1.1 (2018 April) and Open Network Automation Platform, ONAP, that maximize the level of automation of service creation and activation to increase flexibility and reduce costs. This has a huge impact on the orchestration function that has to perform challenging tasks such as, dealing concurrently with very heterogenous entities such as transport, radio, datacentres and virtualized network functions, VNF. There is a large amount of work going on in standardization bodies and open source environments to define user-friendly platforms and environments able to automatize both the design and operation of a service.

The heterogeneity of the different domains (transport, radio, data-centres, VNF) to be managed is very complex to be handled because the domains can belong to different providers; it may be desirable to avoid all domain information being exposed to each provider, it being better not to share some of the information for security/confidentiality reasons. Also, cross-optimization may be complex since the information is heterogenous, because it derives from heterogenous domains and systems.

Integration and set-up of network entities in 5G is also more complex because it must also allow for user mobility. Existing network resource abstraction solutions are based on the concept that a service is required from an ingress point to an egress point that is kept static during the service usage, as compared to a 5G, where a service requires connectivity (that is provided by the cooperation of radio and transport domains) within a geographical area.

Demand for mobile services is expected to continue to grow. The 5G network is expected to support significantly larger amounts of mobile data traffic and a huge number of wireless connections.

In high mobility scenarios, a resource allocation that takes into account the mobility of the end users is fundamental. Although there are several solutions to provide an abstract view of the transport network, several significant challenges remain to be addressed in the context of wireless network abstraction, including isolation, resource discovery and allocation, and mobility management.

SUMMARY

It is an object to provide an improved method of abstracting network resources in a mobile communications network. It is an object to provide an improved apparatus for abstracting network resources in a mobile communications network.

An aspect of the invention provides a method of abstracting network resources in a mobile communications network. The method comprises determining a service coverage area for a class of service, the class of service defined by service parameters. Determining a set of tracking areas that fall at least partly within the service coverage area. The method also comprises selecting available network resources for tracking areas of the set of tracking areas, for providing the class of service in the tracking areas. Further, the method comprises defining an abstraction view of the selected network resources for the class of service in the service coverage area and outputting a communication signal comprising an indication of the abstraction view. The abstraction view comprises deliverable values of the service parameters within the set of tracking areas.

The abstraction view permits network resource allocation to be performed taking into account the mobility of end users and connected things. The use of tracking areas for selecting available network resources may enable latency to be kept low and reduce bandwidth overprovisioning. The method enables network resources to be abstracted taking into account the service coverage area in which a service has to be provided, with its dedicated requirements. The method may enable the use of network resources to be optimized, allocating resources for a service only where and when needed, providing dynamic and mobile-aware resource allocation.

The method of the present invention enables handling of end user mobility while managing network resources. It enables abstraction of network resources for mobile networks, taking into account the mobility of the end users, for a specified service coverage area and class of service. The method enables a "per service" and "per area" abstract view, that a network controller can use to allocate network resources, and is able to also take into account user equipment, UE, mobility in the network. As network complexity continues to increase, the method enables heterogeneous services with different requirements in term of bandwidth and latency to be set up in an efficient and dynamic way.

In an embodiment, the method further comprises a step of recommencing at defining the abstraction view responsive to a change in at least part of the available network resources. Dynamic resource allocation may therefore be provided, avoiding static allocation of valuable network resources.

In an embodiment, the method further comprises a step of checking that the selected network resources are able to deliver the service parameters of the class of service. And a step of, responsive to the checking indicating that at least part of the selected network resources are unable to deliver the service parameters of the class of service, selecting different available network resources for tracking areas of the set of tracking areas, for providing the class of service in the tracking areas. Dynamic resource allocation may therefore be provided.

In an embodiment, the service parameters of the class of service comprise radio domain parameters.

In an embodiment, the service parameters of the class of service comprise a bandwidth and a latency to be delivered for the class of service. The abstraction view comprises a deliverable bandwidth and a deliverable latency for the class of service within the set of tracking areas. The service parameters are therefore abstracted in service-oriented parameters, to facilitate network resource allocation by an orchestrator. The classification and definition of the bandwidth and latency couple for tracking areas allows the allocation of a network slice able to deliver the performance of the requested service in a specific geographical area.

In an embodiment, the service parameters of the class of service additionally comprise at least one of reliability and delay to be delivered for the class of service. The abstraction view additionally comprises at least one of a deliverable reliability and a deliverable delay for the class of service within the set of tracking areas.

In an embodiment, the network resources comprise transport domain resources, radio domain resources and control resources. The method enables handling of end user mobility while managing heterogeneous network resources, i.e. transport domain and radio domain resources, and control resources. The method may enable an abstraction view to be defined that represents heterogeneous domains according to a common model, which may simplify network resource allocation by an orchestrator. The method may provide dynamic resource allocation, avoiding static allocation of valuable radio domain resources, for example static allocation of the radio spectrum may be avoided. The method may allows for efficient allocation of various transport resources, including control system, such as MME/AMF, connectivity needed to manage the tracking areas involved, even when tracking areas are managed by different MMEs/AMFs.

In an embodiment, the radio domain parameters comprise physical layer parameters, such as transmission time interval, TTI, number of frequency carriers and numerology. The method may enable the provision of an abstraction view of network resources for a geographical area, decoupling the physical layer parameters (e.g. frequency, spectrum) from service parameters.

In an embodiment, the deliverable bandwidth and the deliverable latency of the abstraction view comprise representative values of statistically estimated radio domain bandwidth and latency values of the tracking areas.

In an embodiment, the representative value of the deliverable bandwidth is a minimum bandwidth value of the tracking areas and the representative value of the deliverable latency is a maximum latency value of the tracking areas.

In an embodiment, the method further comprises a step of determining representative values of statistically estimated radio domain bandwidth and latency values of the tracking areas responsive to a change in at least one radio domain network parameter.

In an embodiment, the method further comprises a step of re-defining the abstraction view responsive to a change in at least one of the representative values.

In an embodiment, the recommencing at defining the abstraction view is responsive to a change in at least one of available transport domain resources and available radio domain resources. The change may, for example, be due to changes in latency and/or bandwidth estimation during the day, set-up of concurrent services, network congestion or emergency conditions.

In an embodiment, the method further comprises a step of checking that the service parameters of the class of service in the service coverage area are being delivered by the selected network resources. And a step of, responsive to the checking indicating that the service parameters are not being delivered, recommencing at selecting available network resources.

In an embodiment, the method further comprises a step of configuring at least some of the selected network resources before defining the abstraction view.

In an embodiment, the method further comprises a step of receiving a service distribution list defining a plurality of classes of service each defined by respective service parameters and each having a respective service coverage area. And a step of defining a respective network slice for each class of service depending on a service level agreement. The steps of the method described above are performed for each of the plurality of classes of service. The defined abstraction view may facilitate the set-up of many concurrent services and may support several heterogeneous Internet of Things, IoT, connections.

In an embodiment, the defining a network slice comprises instantiating a network slice.

In an embodiment, the tracking areas are configured for tracking area-wide radio paging. The use of tracking areas and tracking area-wide radio paging enables a set of geographical areas to be defined in which specific services with specific requirements (e.g. bandwidth and latency) must be provided.

The method defines an abstraction view that may be compatible with standard and open radio controller nodes, facilitating the Open RAN implementation.

Corresponding embodiments and advantages also apply to the orchestrator described below.

An aspect of the invention provides an orchestrator for a mobile communications network. The orchestrator comprises memory and processing circuitry. The processing circuitry is configured to cause the orchestrator to perform any of the steps of the method of abstracting network resources in a mobile communications network.

Another aspect of the invention provides an apparatus for abstracting network resources in a mobile communications network. The apparatus comprises a processing circuitry and a memory. Said memory contains instructions executable by said processing circuitry whereby said apparatus is operative to determine a service coverage area for a class of service, wherein the class of service is defined by service parameters. The apparatus is also operative to determine a set of tracking areas that fall at least partly within the service coverage area and to select available network resources for tracking areas of the set of tracking areas for providing the class of service in the tracking areas. The apparatus is also operative to define an abstraction view of the selected network resources for the class of service in the service coverage area and output a communication signal comprising an indication of the abstraction view. The abstraction view comprises deliverable values of the service parameters within the set of tracking areas; Preferably, said apparatus may be an orchestrator.

An aspect of the invention provides a computer program, comprising instructions which, when executed on at least one processor, cause the at least one processor to carry out any of the above steps of the method of abstracting network resources in a mobile communications network.

An aspect of the invention provides a data carrier having computer readable instructions embodied therein. The said computer readable instructions are for providing access to resources available on a processor. The computer readable instructions comprise instructions to cause the processor to perform any of the above steps of the method of abstracting network resources in a mobile communications network.

In an embodiment, the data carrier is a non-transitory data carrier.

Embodiments of the invention will now be described, by way of example only, with reference to the accompanying drawings.

DETAILED DESCRIPTION

The same reference numbers will used for corresponding features in different embodiments.

Figure 1:
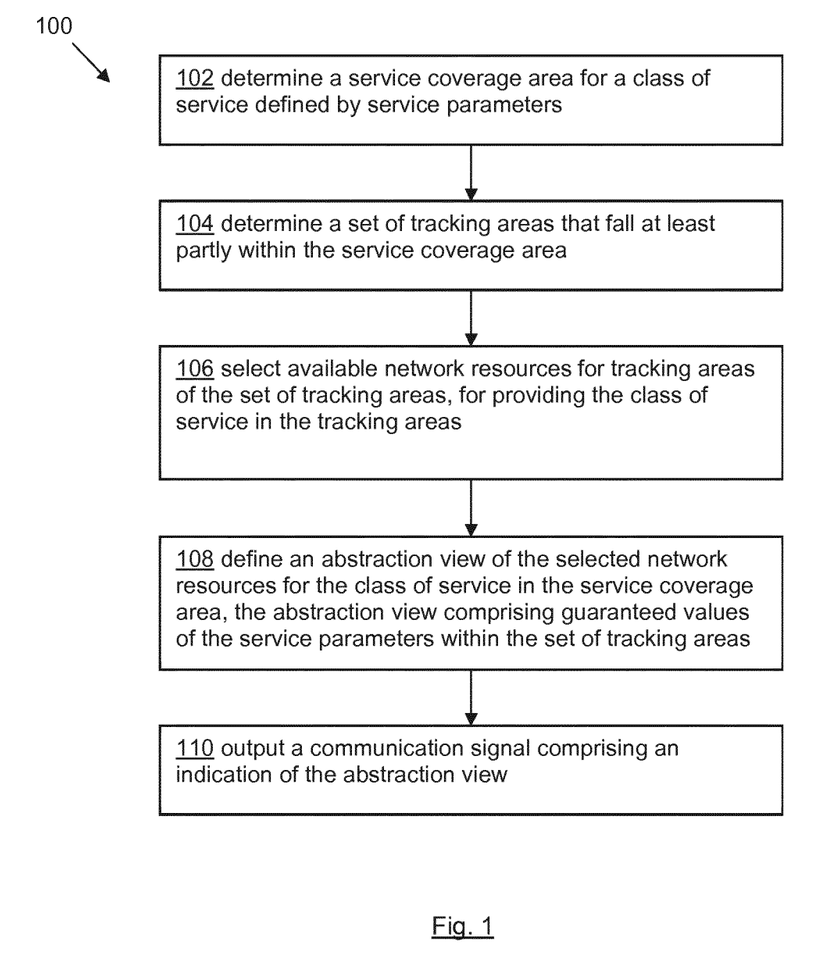
FIGS. 1, 4, and 6 to 8 are flowcharts illustrating embodiments of a method of abstracting network resources in a mobile communications network.

Referring to FIG. 1, an embodiment of the invention provides a method 100 of abstracting network resources in a mobile communications network. The method comprises the following steps. Determining 102 a service coverage area for a class of service; the class of service is defined by service parameters. Determining 104 a set of tracking areas that fall at least partly within the service coverage area. Selecting 106 available network resources for tracking areas of the set of tracking areas, for providing the class of service in the tracking areas. Defining 108 an abstraction view of the selected network resources for the class of service in the service coverage area. The abstraction view comprises deliverable values of the service parameters within the set of tracking areas. The deliverable values are the values of the service parameters that have been agreed under a relevant service level agreement or defined by a relevant policy.

The method further comprises a step of outputting 110 a communication signal comprising an indication of the abstraction view.

The abstraction view is a representation of network resources for a certain geographical area, the service coverage area, where a service must be provided and includes service parameters for the class of service. The communication signal is output to communicate an indication of the abstraction view to an orchestrator and/or network controller of the mobile communications network. The abstraction view may then be used by the orchestrator and/or network controller to allocate network resources.

In an embodiment, the method further comprises a step of recommencing at defining the abstraction view responsive to a change in at least part of the available network resources.

In an embodiment, the method further comprises:
checking that the selected network resources are able to deliver the service parameters of the class of service; and
responsive to the checking indicating that at least part of the selected network resources are unable to deliver the service parameters of the class of service, selecting different available network resources for tracking areas of the set of tracking areas, for providing the class of service in the tracking areas.

In an embodiment, the service parameters of the class of service comprise radio domain parameters.

In an embodiment, the service parameters of the class of service comprise a bandwidth and a latency to be delivered for the class of service. The abstraction view comprises a deliverable bandwidth and a deliverable latency for the class of service within the set of tracking areas.

In an embodiment, the service parameters of the class of service additionally comprise at least one of reliability and delay to be delivered for the class of service.

In an embodiment, the network resources comprise transport domain resources, radio domain resources and control resources.

In an embodiment, the radio domain parameters comprise physical layer parameters, such as transmission time interval, TTI, number of frequency carriers and numerology. The set of physical layer parameters which define orthogonal frequency domain multiplexing, OFDM, in Long Term Evolution/New Radio, LTE/NR, networks is known as "numerology".

In an embodiment, the deliverable bandwidth is a representative value of statistically estimated radio domain bandwidth values of the tracking areas. The deliverable latency is a representative value of statistically estimated radio domain latency values of the tracking areas.

In an embodiment, the representative value of the deliverable bandwidth is a minimum bandwidth value of the tracking areas. The representative value of the deliverable latency is a maximum latency value of the tracking areas.

In an embodiment, the method further comprises a step of determining representative values of statistically estimated radio domain bandwidth and latency values of the tracking areas responsive to a change in at least one radio domain network parameter.

In an embodiment, the method further comprises a step of re-defining the abstraction view responsive to a change in at least one of the representative values.

In an embodiment, the method recommences at defining the abstraction view responsive to a change in at least one of available transport domain resources and available radio domain resources.

In an embodiment, the method further comprises:
checking that the service parameters of the class of service in the service coverage area are being delivered by the selected network resources; and
responsive to the checking indicating that the service parameters are not being delivered, recommencing at selecting available network resources.

In an embodiment, the method further comprises a step of configuring at least some of the selected network resources before defining the abstraction view.

In an embodiment, the method further comprises:
receiving a service distribution list defining a plurality of classes of service each defined by respective service parameters and each having a respective service coverage area; and
defining a respective network slice for each class of service depending on a service level agreement.

The steps of the method 100 described above are performed for each of the plurality of classes of service.

In an embodiment, defining a network slice comprises instantiating a network slice. Based on the service distribution list, a network slice is required for each class of service. When a network slice is instantiated a set of network functions, and resources to run these network functions, are allocated to deliver the required service in compliance with the requests in terms of the service parameters, such as bandwidth and latency.

Figure 2:
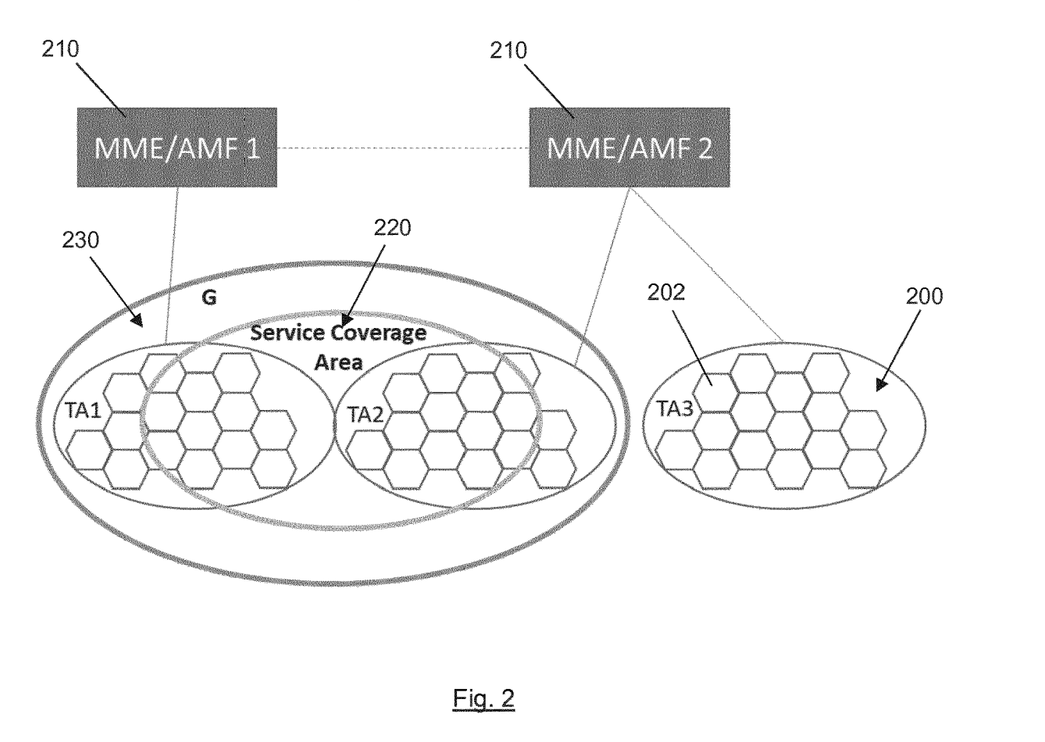
FIGS. 2, 3 and 5 are diagrams illustrating implementation of embodiments of the method of abstracting network resources in a mobile communications network.

Referring to FIG. 2, mobile networks are organized in tracking areas, TAs 200. A TA is a logical group of cells 202 managed by a common mobile management entity MME or access and mobility management function, AMF (AMF in 5G Core networks), MME/AMF 210. Typically, the TAs are defined by the network operator, and each TA has a unique Tracking Area Identifier, TAI:

$$TAI=\{MCC,MNC,TAC\}$$

where MCC is the Mobile Country Code, MNC the Mobile Network, and TAC the TA code that identifies the TA in a univocal way.

In an embodiment, the method 100 of abstracting network resources in a mobile communications network comprises:
  determining a service coverage area 220 for a class of service;
  determining the set of TAs 200 that fall within the service coverage area; we can define a geographical area G 230 as the set of TAs that fall within the service coverage area, as shown in FIG. 2;
  selecting 106 available network resources for TAs of the set of TAs 200, for providing the class of service in the TAs;
  defining 108 an abstraction view of the selected network resources for the class of service in the service coverage area 220; and
  outputting 110 a communication signal comprising an indication of the abstraction view.

The abstraction view comprises deliverable values of the service parameters within the set of TAs. In this embodiment, the service parameters are bandwidth and latency. However, to meet the needs of IoT/Vertical service requests, other service parameters such as reliability and delay can be used in addition or instead.

The class of service is described in terms of the service parameters, i.e. bandwidth and latency to be delivered for that service, and the geographical area where the service must be provided, i.e. the service coverage area.

The TAs are configured for TA-wide radio paging. If there is data traffic heading to a User Equipment, UE, that is in an idle state, for example if someone sends a text message to a UE, the network has to wake up the UE so that it can receive the data. In the method 100 of the present invention, this "waking up" (referred to as "paging") is performed TA-wide.

When the network needs to wake up a UE, because some data for the UE is being received, a paging message is sent to every cell located in the UE TA. Then each cell broadcasts the paging message over the radio link to wake up the UE. A UE in idle state wakes up at certain periods to check for a paging message to see if there is any incoming data. If the UE finds it has been paged by a cell, it turns back to an active state to receive the data.

Each cell can be described as follows:

$$C_i=\{B_i,L_i\}$$

where $B_i$ and $L_i$ are the bandwidth and latency to be delivered for the cell, based on a Service Level Agreement, SLA, or defined in a relevant policy.

For each class of service in a TA, we define a representative value of the deliverable bandwidth and latency. These parameters are defined as follows:

$$B_{TA}=\min_{i=1}^{N}\{B_i\}$$

$$L_{TA}=\max_{i=1}^{N}\{L_i\}$$

where N is the number of cells, C, in the TA. $B_{TA}$ is the minimum value of statistically estimated radio domain bandwidth values of the TAs and $L_{TA}$ is the maximum value of statistically estimated radio domain latency values of the TAs.

Thus, each TA can be formally described as:

$$TA_i=ID_i,\{C_i\}_{i=1}^{N},B_{TA},L_{TA},MME$$

ID is the TA identifier, TAI, Ci is the list of cells that are in the same TA, and MME/AMF is the control system associated to the TA and the related connectivity.

Given the service coverage area 220, we define the geographical area G 230 as the set of TAs that fall in the service coverage area, as shown in FIG. 2.

G is defined as follows:

$$G=G_{ID},\{TA_1,\ldots,TA_M\},B_G,L_g$$

where $G_{ID}$ is the ID of the geographical area and is defined as $$G_{ID}=MCC,MNC,TAC_1,\ldots,TAC_N$$

$B_G$ and $L_G$ are the deliverable bandwidth and latency for the specific service in the area G and are defined as follows:

$$B_G=\min_{i=1}^{M}\{B_{TA}\}$$

$$L_G=\max_{i=1}^{M}\{L_{TA}\}$$

The classification and definition of the bandwidth and latency couple for cells, TA and G, allows the instantiation of a network slice able to deliver the requested service in a specific geographical area.

The method also allows for the efficient allocation of various transport resources, including MME/AMF connectivity needed to manage the tracking areas involved, even in the case of tracking areas are managed from different MMEs/AMFs.

The defined abstraction view comprises the calculated $B_G$ and $L_G$.

The use of TAs and TA-wide radio paging enables definition of a geographical area with related transport and control resources (MME/AMF), used when a particular class of service, with specific service parameters (e.g. bandwidth and latency) has to be provided. The described method thus allows a "per service" and "per area" abstract view to be defined, which a network controller can use to allocate network resources. The method is able to also take into account the mobility of user equipment, UE, within a network.

Figure 3:
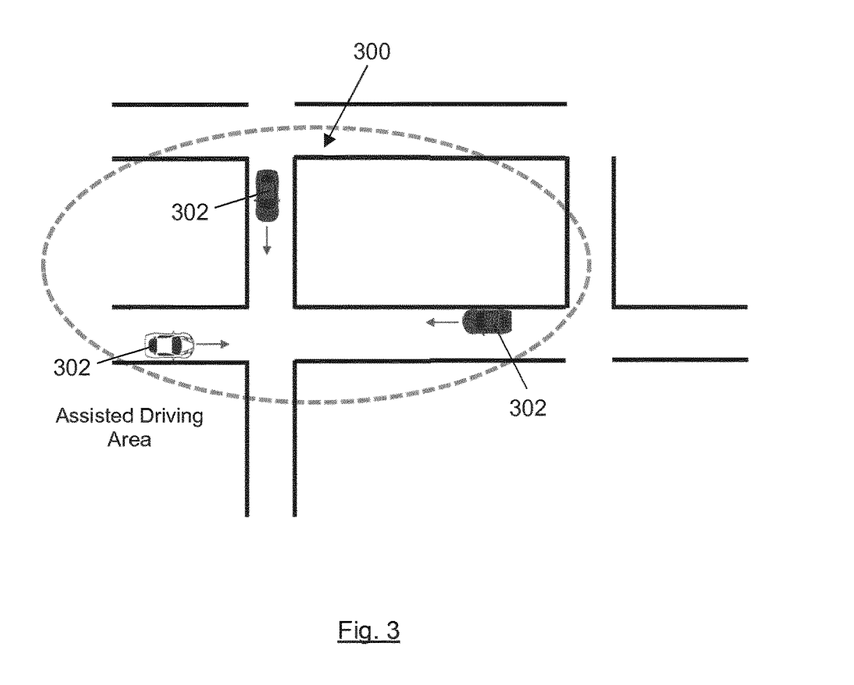
Figure 4:
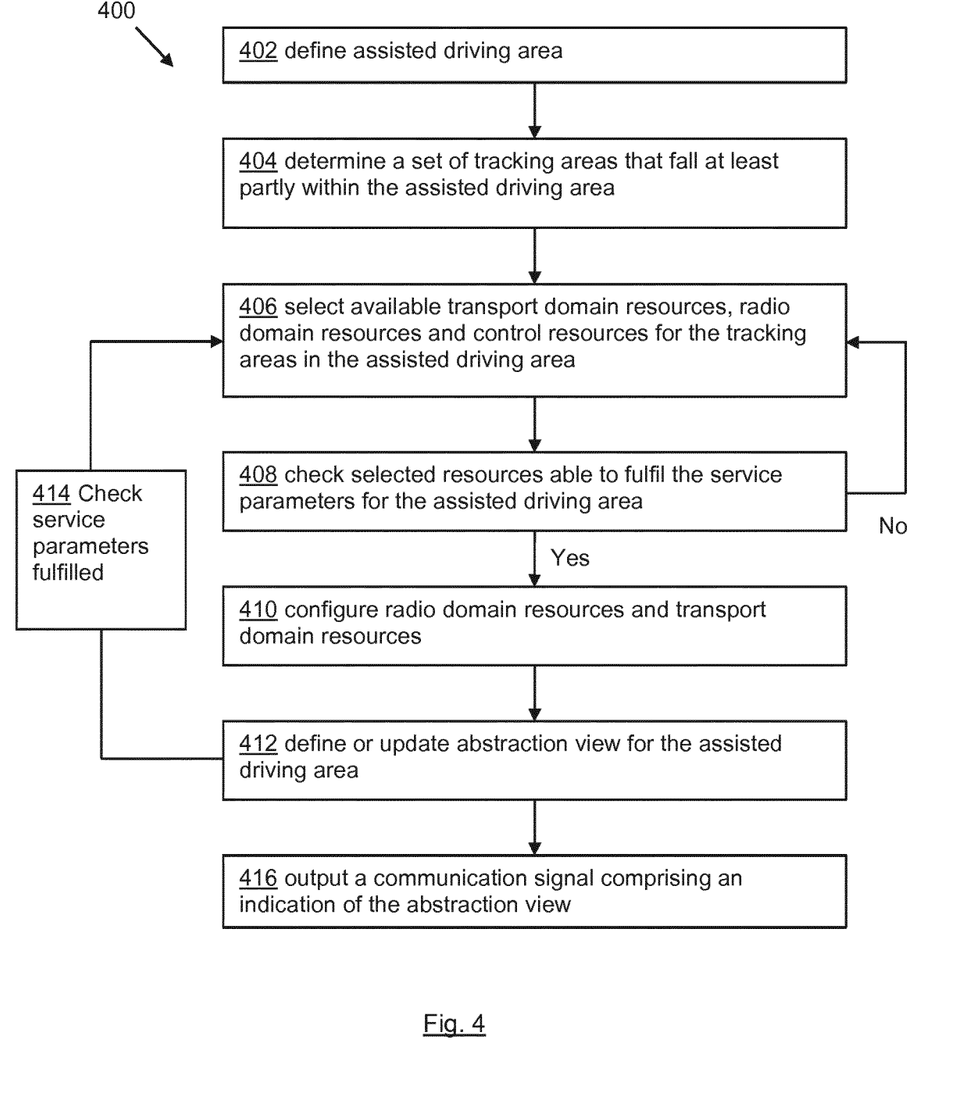

Referring to FIGS. 3 and 4, an embodiment of the invention provides a method 400 of abstracting network resources in a mobile communications network, which in this embodiment is for providing safe communication between vehicles 302 in an assisted driving area 300.

The method 400 comprises the following steps. Defining 402 a service coverage area for a class of service, i.e. defining the assisted driving area 300. The class of service, i.e. safe communication for assisted driving, is defined by service parameters. The step of defining the assisted driving area may be triggered change responsive to changes in vehicular traffic conditions and may therefore change responsive to changes in vehicular traffic conditions.

Determining 404 a set of tracking areas that fall at least partly within the assisted driving area. Selecting 406 available network resources, in this example transport domain resources, radio domain resources and control resources, the tracking areas, TAs, in the assisted driving area, for providing assisted driving service in the TAs. The method 400 comprises checking that the selected resources are able to deliver the service parameters, i.e. meet the deliverable bandwidth and latency, for the assisted driving area. The check may be performed considering network traffic forecast and network traffic Quality of Service, QoS, or Quality of Experience, QoE, measurements, such as priority and latency.

If the selected resources are not able to deliver the service parameters, the method recommences at selecting 406 available network resources. Otherwise the method proceeds to configuring 410 the selected radio domain and transport domain resources. The radio domain resources may be configured per class of service in terms of different available numerologies, such as TTI and number of frequency carriers. The transport domain resources may be configured in terms of QoS. Pre-emption of radio/transport resources may be applied.

The method 400 then performs defining 412 an abstraction view of the selected network resources for the safe communication between vehicles in the assisted driving area. The method comprises a repeating check 414 that the service parameters are being delivered by the selected network resources. This enables the method to ensure that the service parameters are being met without requiring static allocation of radio or transport resources.

If the service parameters are not being delivered, the steps of selecting 406, checking 408 and configuring 410 are repeated, and the abstraction view is updated/redefined 412. This enables the abstraction view to be dynamically updated following any changes in available radio, transport and control resources, for example changes in latency or bandwidth estimation during the day, set-up of concurrent services or network traffic congestion.

The method further comprises outputting 416 a communication signal comprising an indication of the abstraction view.

In this embodiment, radio and transport resources are dynamically allocated for a specific class of service, i.e. safe communication between vehicles, in the assisted driving area and they are used to define an abstract view. The method 400 may be managed by an orchestrator, as described below.

Figure 5:
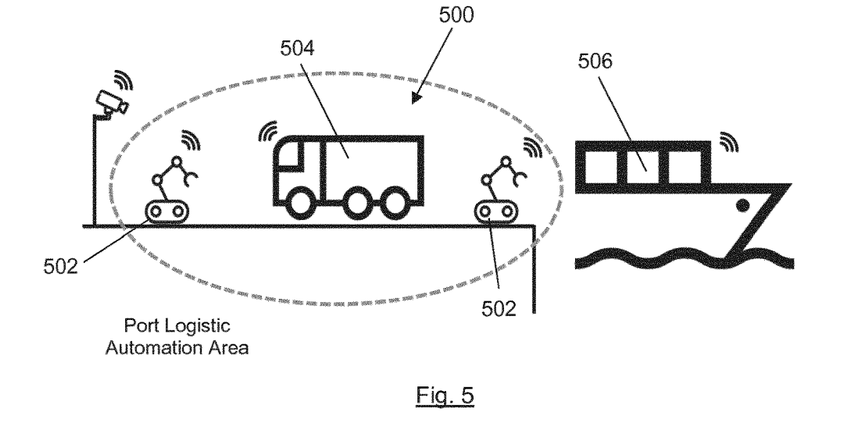
Figure 6:
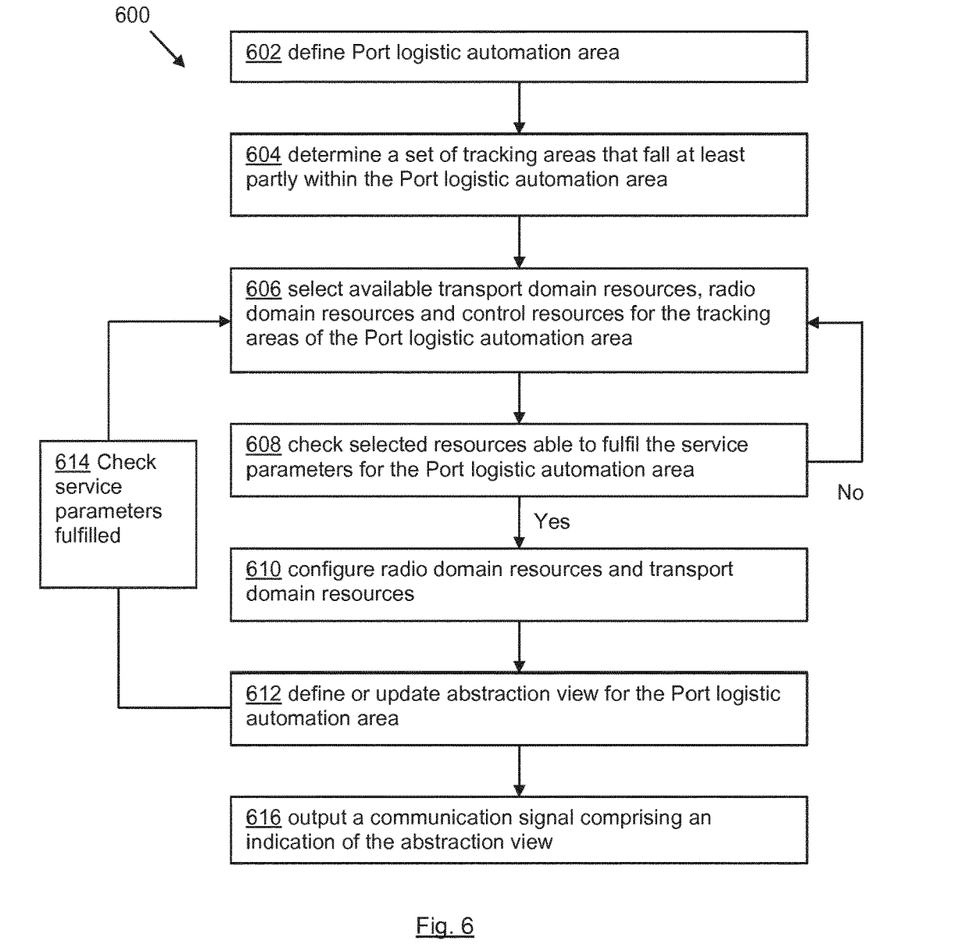

Referring to FIGS. 5 and 6, an embodiment of the invention provides a method 600 of abstracting network resources in a mobile communications network, which in this embodiment is for providing latency-controlled communication between robots 502 and vehicles 504 in port logistic automation area 500.

The method 600 comprises the following steps. Defining 602 a service coverage area for a class of service, i.e. defining the Port logistic automation area 500. The class of service, i.e. latency-controlled communication for robots 502 and vehicles 504, is defined by service parameters. The step of defining the Port logistic automation area may be triggered responsive to a ship 506 docking.

Determining 604 a set of tracking areas that fall at least partly within the port logistic automation area. Selecting 606 available network resources, in this example transport domain resources, radio domain resources and control resources, the tracking areas, TAs, in the port logistic automation area, for providing port logistic automation service in the TAs. The method 600 comprises checking that the selected resources are able to deliver the service parameters, i.e. meet the deliverable bandwidth and latency, for the port logistic automation area. The check may be performed considering network traffic forecast and network traffic Quality of Service, QoS, or Quality of Experience, QoE, measurements, such as priority and latency.

If the selected resources are not able to deliver the service parameters, the method recommences at selecting 606 available network resources. Otherwise the method proceeds to configuring 610 the selected radio domain and transport domain resources. The radio domain resources may be configured per class of service in terms of different available numerologies, such as TTI and number of frequency carriers. The transport domain resources may be configured in terms of QoS. Pre-emption of radio/transport resources may be applied.

The method 600 then performs defining 612 an abstraction view of the selected network resources for the latency-controlled communication with the port logistic automation area. The method comprises a repeating check 614 that the service parameters are being delivered by the selected network resources. This enables the method to ensure that the service parameters are being met without requiring static allocation of radio, control or transport resources.

If the service parameters are not being delivered, the steps of selecting 606, checking 608 and configuring 610 are repeated, and the abstraction view is updated/redefined 612. This enables the abstraction view to be dynamically updated following any changes in available radio and transport resources, for example changes in latency or bandwidth estimation during the day, set-up of concurrent services or network traffic congestion.

The method further comprises outputting 616 a communication signal comprising an indication of the abstraction view.

In this embodiment, radio and transport resources are dynamically allocated for the specific class of service in the port logistic automation area and they are used to define the abstract view. The method 600 may be managed by an orchestrator, as described below.

Figure 7:
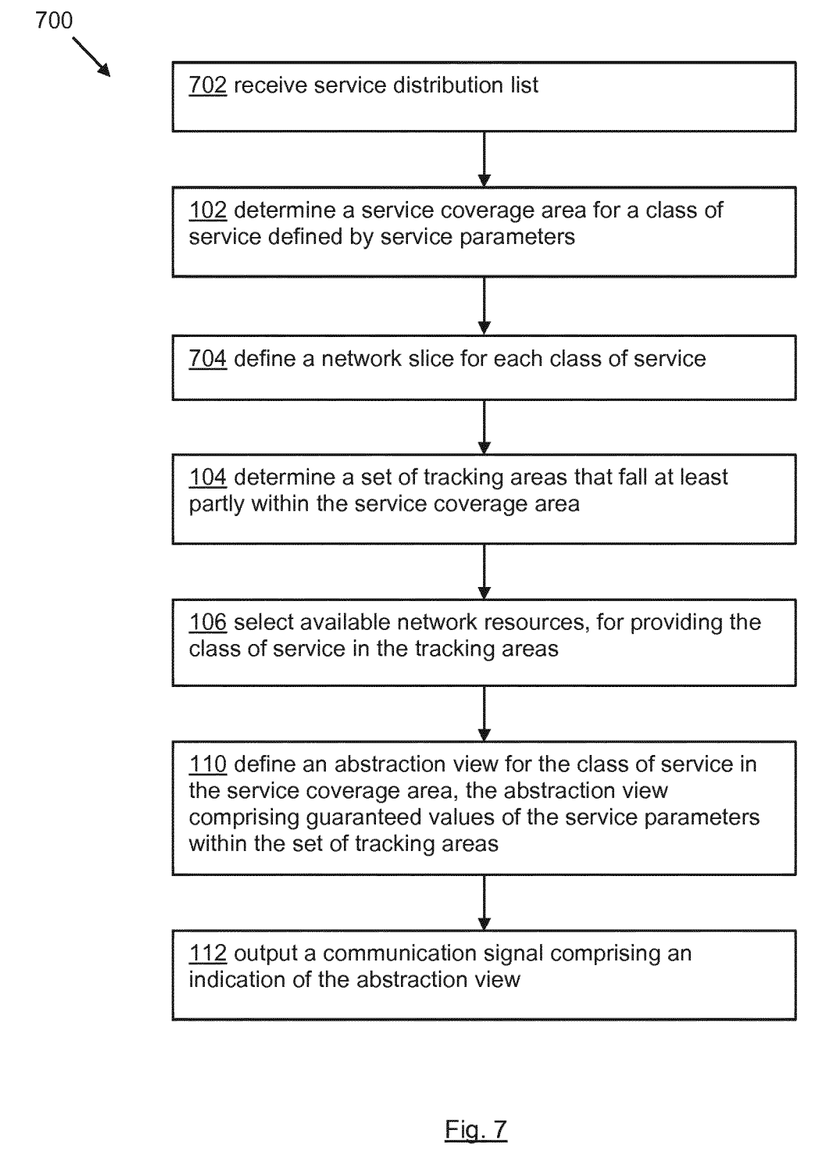

Referring to FIG. 7, in an embodiment the method 700 of abstracting network resources may be applied to a plurality of classes of service, received 702 as a service distribution list. For each class of service, a network slice is defined 704, and the above described steps are performed.

Figure 8:
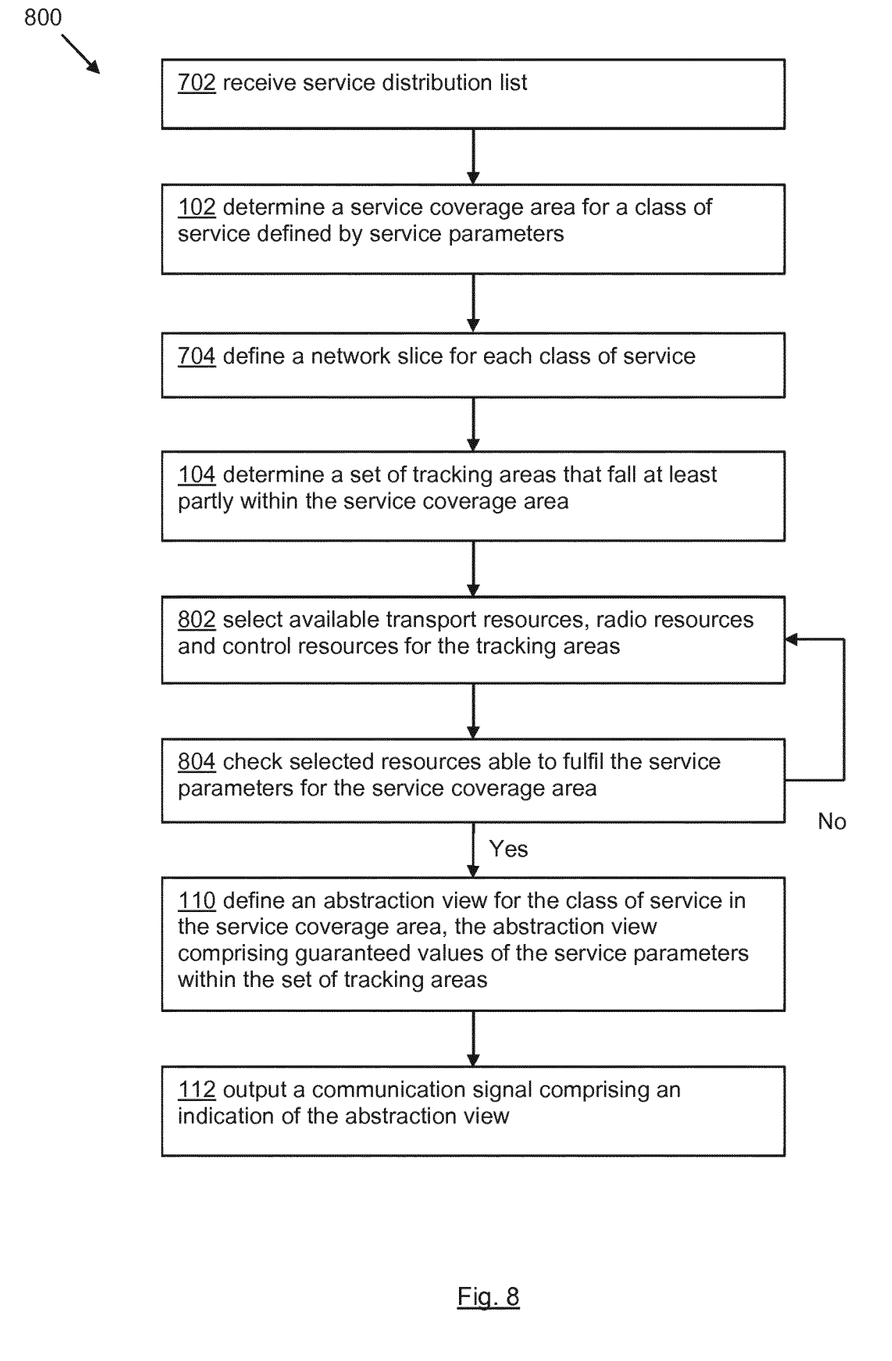

In an embodiment, illustrated in FIG. 8, the step of selecting available network resources comprises:
 selecting 802 available transport resources, radio resources and control resources for the tracking areas; and
 checking 804 that the selected resources are able to deliver the service parameters for the service coverage area. If the check is failed, the method recommences at selecting 802 available resources.

The abstraction view that is defined is compatible with two possible approaches. The first one (called "Radio Controller Node") can be applied to standard radio domain systems that have internal controllers of the Radio Area Network (RAN) to manage radio specific parameters. The second one (called "Open Radio Controller Node") can be applied to new radio systems based on the recent OpenRAN paradigm. In this last scenario the radio domain system is more "open and modular, which a standardized control that can be abstracted and exported.

Corresponding embodiments and advantages also apply to the orchestrator described below.

Figure 9:
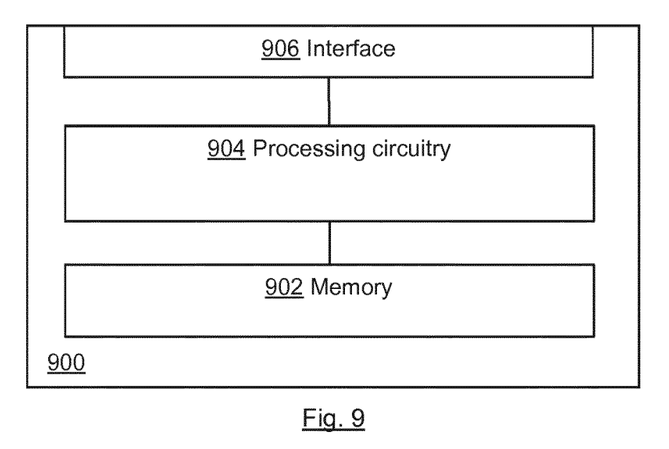
FIGS. 9 to 11 are block diagrams illustrating embodiments an apparatus for abstracting network resources in a mobile communications network.

Referring to FIG. 9, an embodiment provides apparatus 900 for abstracting network resources in a mobile communications network. The apparatus 900 comprises processing circuitry 904 and a memory 902. The memory contains instructions executable by the processing circuitry whereby the apparatus is operative to:
 determine a service coverage area for a class of service, the class of service defined by service parameters;
 determine a set of tracking areas that fall at least partly within the service coverage area;

select available network resources for tracking areas of the set of tracking areas, for providing the class of service in the tracking areas;

define an abstraction view of the selected network resources for the class of service in the service coverage area, the abstraction view comprising deliverable values of the service parameters within the set of tracking areas; and output a communication signal comprising an indication of the abstraction view.

The apparatus, 900, in one embodiment may include a processing circuitry (one or more than one processor), 904, coupled to an interface, 906, and to the memory 902. The apparatus, 900, may comprise more than one interface. For example, one interface may be an Ethernet interface for communicating with network elements and nodes of the mobile communications network, and another interface may be provided for a network operator to perform management operations on the apparatus 900. By way of example, the interface 906, the processor(s) 904, and the memory 902 may be connected in series as illustrated in FIG. 9. Alternatively, these components 902, 904 and 906 may be coupled to an internal bus system of the apparatus, 900. The memory 902 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 902, may include software and/or control parameters. The memory, 902, may include suitably configured program code to be executed by the processor(s), 904, so as to implement the above-described method as explained above.

In one embodiment the apparatus, 900, may be implemented as a separate unit. Alternatively, the apparatus may be integrated in another network element. In yet another embodiment the apparatus 900 may be a software function or a hardware component of another network element.

It is to be understood that the structures as illustrated in FIG. 9 are merely schematic and that the apparatus, 900, may actually include further components which, for the sake of clarity, have not been illustrated, e.g., further interfaces or processors. Also, it is to be understood that the memory, 902, may include further program code for implementing other and/or known functionalities.

The apparatus, 900, is further configured to carry out all the other embodiments of the methods described above.

Figure 10:
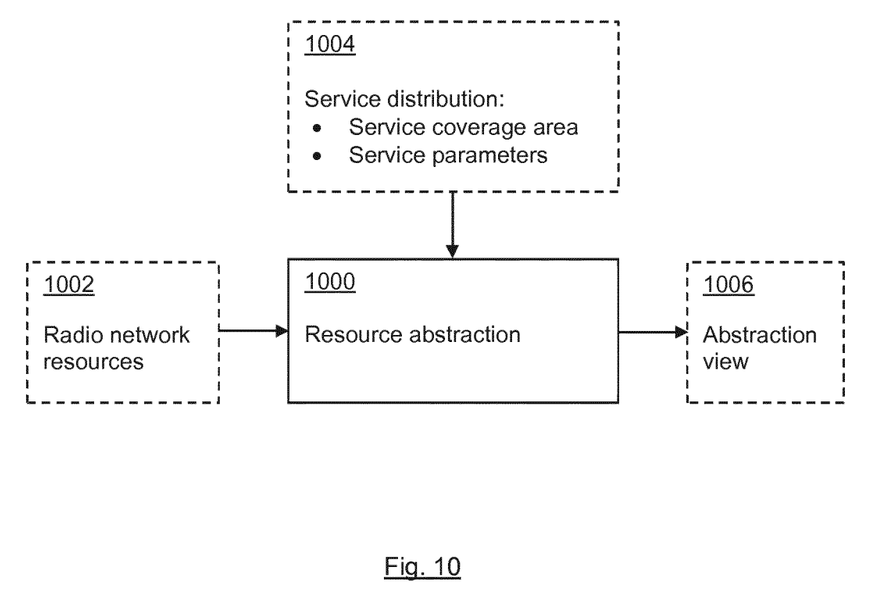

Referring to FIG. 10, an embodiment provides apparatus 1000 for abstracting network resources in a mobile communications network. The apparatus 1000 comprises processing circuitry and a memory. The memory contains instructions executable by the processing circuitry whereby the apparatus is operative as a resource abstraction module. The resource abstraction module may be implemented as a functional block of an orchestrator (for example, a Network Function Virtualisation, NFV, Orchestrator, NFVO or a Single Layer Point of Contact, SLPOC, as defined in the ETSI IFA 028 standard) on top of the radio and transport domains.

The resource abstraction module 1000 is configured to interact with a transport controller and a radio controller (for example, a Software Defined Networking, SDN, controller or a proprietary controller) of the underlying communication network.

The resource abstraction module can run on a general-purpose PC that may be local or remote. In an embodiment, the resource abstraction module interacts with the network management system via a standard South-Bound Interface, SBI, such as IFA005 or IFA006, if it is an SLPOC orchestrator. The resource abstraction module is configured to provide the abstraction view to the entity that will use the abstraction view, such as a Service orchestrator or Virtualised Network Function Manager, VNFM, via a standard North-Bound Interface, NBI, such as IFA005.

As inputs, the resource abstraction module 1000 receives radio network resources information 1002 and a service distribution list 1004, comprising the service coverage area and service parameters for classes of services, and outputs the abstraction view 1006.

Figure 11:
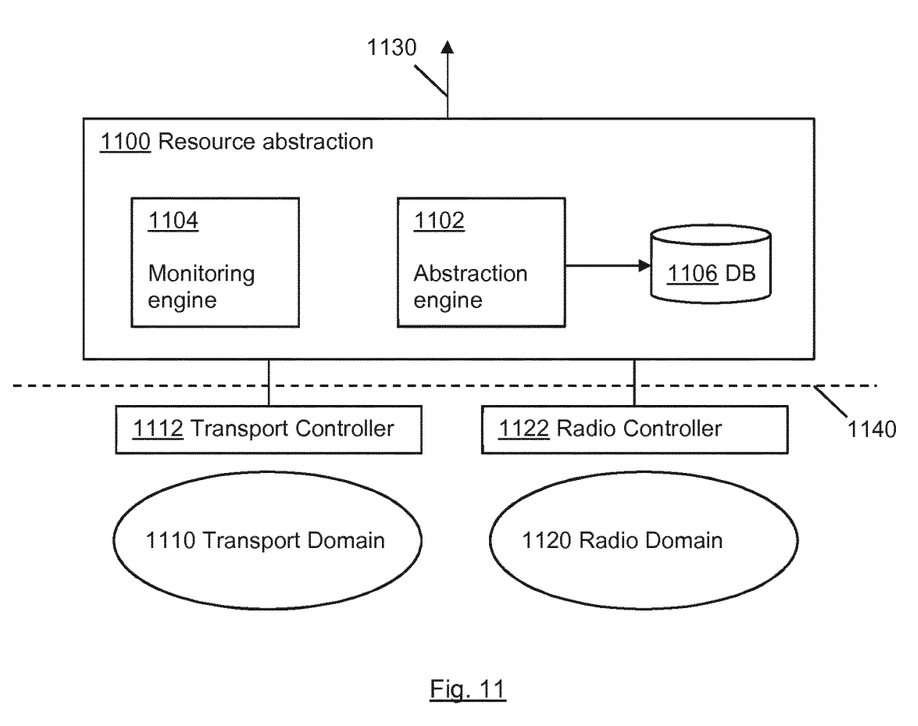

Referring to FIG. 11, an embodiment provides apparatus 1100 for abstracting network resources in a mobile communications network. The apparatus 1100 comprises processing circuitry and a memory. The memory contains instructions executable by the processing circuitry whereby the apparatus is operative as a resource abstraction module, comprising an abstraction engine 1102, a monitoring engine 1104 and a database, DB, 1106.

The resource abstraction module 1100 is put on top of the radio domain 1120 and the transport domain 1110 in the network layers stack and is configured to interact with a transport controller 1112 and a radio controller 1122, via a standard SBI 1240, and to provide the abstraction view to an entity such as a Service orchestrator or VNFM via a standard NBI, 1130.

The memory contains instructions executable by the processing circuitry whereby the abstraction engine 1102 is operative to:

determine a service coverage area for a class of service, the class of service defined by service parameters;

determine a set of tracking areas that fall at least partly within the service coverage area;

select available network resources for tracking areas of the set of tracking areas, for providing the class of service in the tracking areas;

define an abstraction view of the selected network resources for the class of service in the service coverage area, the abstraction view comprising deliverable values of the service parameters within the set of tracking areas; and output a communication signal comprising an indication of the abstraction view.

The DB maintains information about network resources and the abstraction view, and may for example by a mySQL DB.

The memory contains instructions executable by the processing circuitry whereby the monitoring engine 1104 is operative to check that the service parameters are delivered time by time, avoiding static allocation of valuable network resources such as the radio spectrum, as described above.

The apparatus allows abstracted network resources to be provided for a geographical area, while supporting the mobility of the end users, decoupling physical layer parameters, such as radio frequencies and spectrum, from service parameters.

It is also to be understood that the apparatus, 900, 1000 and 1100, may be provided as a virtual apparatus. In one embodiment, the apparatus, 900, 1000 and 1100, may be provided in distributed resources, such as in cloud resources. When provided as virtual apparatus, it will be appreciated that the memory, 902, processing circuitry, 904, and physical interface(s), 906, may be provided as functional elements. The functional elements may be distributed in a logical network and not necessarily be directly physically connected.

The apparatus, 900, 1000 and 1100, is further configured to carry all the other embodiments of the methods described above.

According to some embodiments, also a computer program may be provided for implementing functionalities of the apparatus, 900, e.g. in the form of a physical medium storing the program code and/or other data to be stored in the memory 902, or by making the program code available for download or by streaming.

One of these embodiments provides a computer program, comprising instructions which, when executed on at least one processor, cause the at least one processor to carry out any of the above steps of the method of abstracting network resources in a mobile communications network.

Another one of these embodiments provides a data carrier having computer readable instructions embodied therein. The said computer readable instructions are for providing access to resources available on a processor. The computer readable instructions comprise instructions to cause the processor to perform any of the above steps of the method of abstracting network resources in a mobile communications network.

In an embodiment, the data carrier is a non-transitory data carrier.

The invention claimed is:

1. A method of abstracting network resources in a mobile communications network, the network resources comprising transport domain resources, radio domain resources and control resources, the method comprising:
   determining a service coverage area for a class of service, the class of service defined by service parameters comprising a bandwidth, a latency, and a reliability to be delivered for the class of service, and an abstraction view comprising a deliverable bandwidth, a deliverable latency, and a deliverable reliability for the class of service within a set of tracking areas, the deliverable bandwidth and the deliverable latency of the abstraction view comprising representative values of statistically estimated radio domain bandwidth and latency values of the tracking areas;
   determining the set of tracking areas that fall at least partly within the service coverage area;
   selecting available network resources for tracking areas of the set of tracking areas, for providing the class of service in the tracking areas;
   checking that the selected network resources are able to deliver the service parameters of the class of service;
   responsive to the checking indicating that at least part of the selected network resources are unable to deliver the service parameters of the class of service, selecting different available network resources for tracking areas of the set of tracking areas, for providing the class of service in the tracking areas;
   defining the abstraction view of the selected network resources for the class of service in the service coverage area, the abstraction view comprising deliverable values of the service parameters within the set of tracking areas; and
   outputting a communication signal comprising an indication of the abstraction view.

2. The method of claim 1, further comprising recommencing at defining the abstraction view responsive to a change in at least part of the available network resources.

3. The method of claim 1, further comprising determining representative values of statistically estimated radio domain bandwidth and latency values of the tracking areas responsive to a change in at least one radio domain network parameter.

4. The method of claim 1, further comprising re-defining the abstraction view responsive to a change in at least one of the representative values.

5. The method of claim 1, further comprising:
   checking that the service parameters of the class of service in the service coverage area are being delivered by the selected network resources; and
   responsive to the checking indicating that the service parameters are not being delivered, recommencing at selecting available network resources.

6. The method of claim 1, further comprising configuring at least some of the selected network resources before defining the abstraction view.

7. An apparatus for abstracting network resources in a mobile communications network, the network resources comprising transport domain resources, radio domain resources and control resources, the apparatus comprising processing circuitry and a memory, the memory containing instructions executable by the processing circuitry to cause the apparatus to:
   determine a service coverage area for a class of service, the class of service defined by service parameters comprising a bandwidth, a latency, and a reliability to be delivered for the class of service, and an abstraction view comprising a deliverable bandwidth, a deliverable latency, and a deliverable reliability for the class of service within a set of tracking areas, the deliverable bandwidth and the deliverable latency of the abstraction view comprising representative values of statistically estimated radio domain bandwidth and latency values of the tracking areas;
   determine the set of tracking areas that fall at least partly within the service coverage area;
   select available network resources for tracking areas of the set of tracking areas, for providing the class of service in the tracking areas;
   check that the selected network resources are able to deliver the service parameters of the class of service;
   responsive to the checking indicating that at least part of the selected network resources are unable to deliver the service parameters of the class of service, select different available network resources for tracking areas of the set of tracking areas, for providing the class of service in the tracking areas;
   define the abstraction view of the selected network resources for the class of service in the service coverage area, the abstraction view comprising deliverable values of the service parameters within the set of tracking areas; and
   output a communication signal comprising an indication of the abstraction view.

8. The apparatus of claim 7, wherein the instructions executable by the processing circuitry further cause the apparatus to recommence at defining the abstraction view responsive to a change in at least part of the available network resources.

9. The apparatus of claim 7, wherein the instructions executable by the processing circuitry further cause the apparatus to:
   check that the service parameters of the class of service in the service coverage area are being delivered by the selected network resources; and responsive to the checking indicating that the service parameters are not being delivered, recommence at selecting available network resources.

10. The apparatus of claim 7, for the plurality of classes of service, operative to:
receive a service distribution list defining a plurality of classes of service, the classes of service being defined by respective service parameters and having a respective service coverage area;
define a respective network slice for the classes of service depending on a service level agreement.

11. The apparatus of claim 7, further comprising an orchestrator.

12. A non-transitory computer storage medium storing a computer program, comprising instructions which, when executed on at least one processor, cause the at least one processor to carry out a method of abstracting network resources in a mobile communications network, the network resources comprising transport domain resources, radio domain resources and control resources, the method comprising:
determining a service coverage area for a class of service, the class of service defined by service parameters comprising a bandwidth, a latency, and a reliability to be delivered for the class of service, and an abstraction view comprising a deliverable bandwidth, a deliverable latency, and a deliverable reliability for the class of service within a set of tracking areas, the deliverable bandwidth and the deliverable latency of the abstraction view comprising representative values of statistically estimated radio domain bandwidth and latency values of the tracking areas;
determining the set of tracking areas that fall at least partly within the service coverage area;
selecting available network resources for tracking areas of the set of tracking areas, for providing the class of service in the tracking areas;
checking that the selected network resources are able to deliver the service parameters of the class of service;
responsive to the checking indicating that at least part of the selected network resources are unable to deliver the service parameters of the class of service, selecting different available network resources for tracking areas of the set of tracking areas, for providing the class of service in the tracking areas;
defining the abstraction view of the selected network resources for the class of service in the service coverage area, the abstraction view comprising deliverable values of the service parameters within the set of tracking areas; and
outputting a communication signal comprising an indication of the abstraction view.

* * * * *